United States Patent
Willis et al.

(10) Patent No.: US 9,021,016 B2
(45) Date of Patent: Apr. 28, 2015

(54) METHOD, APPARATUS AND SYSTEM FOR MANAGING COMMUNICATIONS BETWEEN A COMPUTING DEVICE AND A CLIENT MACHINE

(75) Inventors: Edward Snow Willis, Ottawa (CA); Ennis Al-Asaaed, Ottawa (CA); Michael Ian Clough, Ottawa (CA); Cédric Charrier, Ottawa (CA); Timothy Richard Tyhurst, Kitchener (CA); George Dos Santos, Toronto (CA); Aleksandar Ristovski, Ottawa (CA); Sean Derek Boudreau, Stittsville (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 235 days.

(21) Appl. No.: 13/204,442

(22) Filed: Aug. 5, 2011

(65) Prior Publication Data
US 2012/0079006 A1    Mar. 29, 2012

Related U.S. Application Data

(60) Provisional application No. 61/386,781, filed on Sep. 27, 2010.

(51) Int. Cl.
  G06F 15/16      (2006.01)
  H04W 4/00      (2009.01)
  H04L 29/08      (2006.01)

(52) U.S. Cl.
  CPC .............. *H04W 4/001* (2013.01); *H04W 4/003* (2013.01); *H04L 67/02* (2013.01)

(58) Field of Classification Search
  CPC ....................................................... H04L 67/02
  USPC ................................................. 709/201, 203
  See application file for complete search history.

(56) References Cited

U.S. PATENT DOCUMENTS

| 6,157,941 A | 12/2000 | Verkler et al. |
| 6,282,709 B1 | 8/2001 | Reha et al. |
| 6,308,061 B1 | 10/2001 | Criss et al. |

(Continued)

FOREIGN PATENT DOCUMENTS

| CA | 2583184 C | 6/2012 |
| EP | 1630690 A1 | 3/2006 |

(Continued)

OTHER PUBLICATIONS

Extended European Search Report mailed Dec. 20, 2011. In corresponding application No. 11160507.7.

(Continued)

*Primary Examiner* — Quang N Nguyen
*Assistant Examiner* — Andrew Woo
(74) *Attorney, Agent, or Firm* — Fish & Richardson P.C.

(57) ABSTRACT

A method, apparatus and system for managing communications between a client machine and a mobile computing device. The mobile computing device comprising: a storage configured to maintain a host application; a processor configured to execute the host application; an interface configured to connect to the client machine, the interface further configured to carry a web request from the client machine to the processor, the host application configured to respond to the web request.

16 Claims, 8 Drawing Sheets

(56) References Cited

U.S. PATENT DOCUMENTS

| | | | |
|---|---|---|---|
| 7,103,656 B2* | 9/2006 | Lewis et al. | 709/223 |
| 7,251,727 B2 | 7/2007 | Adams et al. | |
| 7,546,595 B1 | 6/2009 | Wickham et al. | |
| 7,555,749 B2 | 6/2009 | Wickham et al. | |
| 2002/0161796 A1* | 10/2002 | Sylthe | 707/500 |
| 2002/0163895 A1 | 11/2002 | Haller et al. | |
| 2004/0015948 A1 | 1/2004 | Sueyoshi et al. | |
| 2004/0199633 A1 | 10/2004 | Pearson | |
| 2005/0278716 A1 | 12/2005 | Koppen et al. | |
| 2006/0013258 A1 | 1/2006 | Banerjee et al. | |
| 2006/0212548 A1 | 9/2006 | Faisal et al. | |
| 2008/0005247 A9 | 1/2008 | Khoo | |
| 2008/0132202 A1 | 6/2008 | Kirkup et al. | |
| 2008/0172663 A1 | 7/2008 | Lee | |
| 2009/0024982 A1 | 1/2009 | Diep et al. | |
| 2009/0075697 A1* | 3/2009 | Wilson et al. | 455/557 |
| 2009/0248820 A1 | 10/2009 | Basir et al. | |
| 2012/0054616 A1 | 3/2012 | Mittal | |

FOREIGN PATENT DOCUMENTS

| KR | 20040059530 A | 7/2004 |
|---|---|---|
| WO | 2006066411 A1 | 6/2006 |
| WO | 2010/123757 A1 | 10/2010 |

OTHER PUBLICATIONS

Extended European Search Report mailed Jan. 13, 2012. In corresponding application No. 11176655.6.

Wikipedia: Mobile Web Server (Symbianos_Internet Article, Sep. 11, 2010 XP55015014, Retrieved from the internet:URL:http://en.wikipedia.org/w/index.php?title=Mobile_Web_Server_%28Symbian_OS%29&oldid=384209208. Retrieved on Dec. 16, 2011.

International Search report mailed Dec. 1, 2011. In corresponding application No. PCT/CA2011/001068.

Written Opinion of the International Searching Authority mailed Dec. 1, 2011. In corresponding application No. PCT/CA2011/001068.

Android Tethering; http://lifehacker.com/5447347/how-to-tether-your-andorid-phone; retrieved on Dec. 14, 2010.

iPhone as WiFi Router Using PDA Net Software; Oct. 21, 2008; http://www.intomobile.com/2008/10/21/iphone-wifi-router-pda-net-makes-iphone-3g-tethering-easier-than-ever/; retrieved on Dec. 14, 2010.

Things to Know Before Installing Windows Updates/SpywarePreventionGuy; Jun. 1, 2010 Downloaded from: http://spywarepreventionguy.com/windows-updates/.

Nimbus Land.blogspot; Nov. 16, 2008 Downloaded from: http://mnimbusland.blogspot.ca/2008_11_16_archive.html.

Nokia N95- Wikipedia, the free encyclopedia. http://en.wikipedia.org/w/index.php?title=Nokia_N95&oldid=386408046; Retrieved on Oct. 12, 2012.

Examination report mailed Oct. 18, 2012, in corresponding European patent application No. 11176655.6.

Summons to attend oral proceedings pursuant to Rule 115(1) EPC mailed Jan. 30, 2014; in corresponding European patent application No. 11176655.6.

Lucinda Dykes: "XML for Dummies, 4th Edition", May 20, 2005; Wiley Publishing, Indiana; XP055096783, ISBN: 978-0-76-458845-7, pp. i-xviii.

Ian Mcdowall: "Programming PC Connectivity Applications for Symbian OS: Smartphone Synchronization and Connectivity for Enterprise and Application Developers", Oct. 1, 2004; Wiley, XP055096823; ISBN: 978-0-47-009053-4, p. 409.

* cited by examiner

METHOD, APPARATUS AND SYSTEM FOR MANAGING COMMUNICATIONS BETWEEN A COMPUTING DEVICE AND A CLIENT MACHINE

CROSS-REFERENCE TO RELATED APPLICATIONS

This application claims priority to U.S. Provisional Patent Application No. 61/386,781, filed Sep. 27, 2010, the contents of which are expressly incorporated herein by reference in its entirety.

FIELD

The present specification relates generally to computing devices and more particular relates to a method, apparatus and system for managing communications between a computing device and a client machine.

BACKGROUND

The evolution of computers is currently quite active in the mobile device environment. It is now well-known to include calendaring, contacts, and messaging functions in mobile devices. It can be desired to manage functions on the mobile computing device through a universal serial bus (USB) or other local connection to a desktop, laptop or other client machine.

BRIEF DESCRIPTION OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
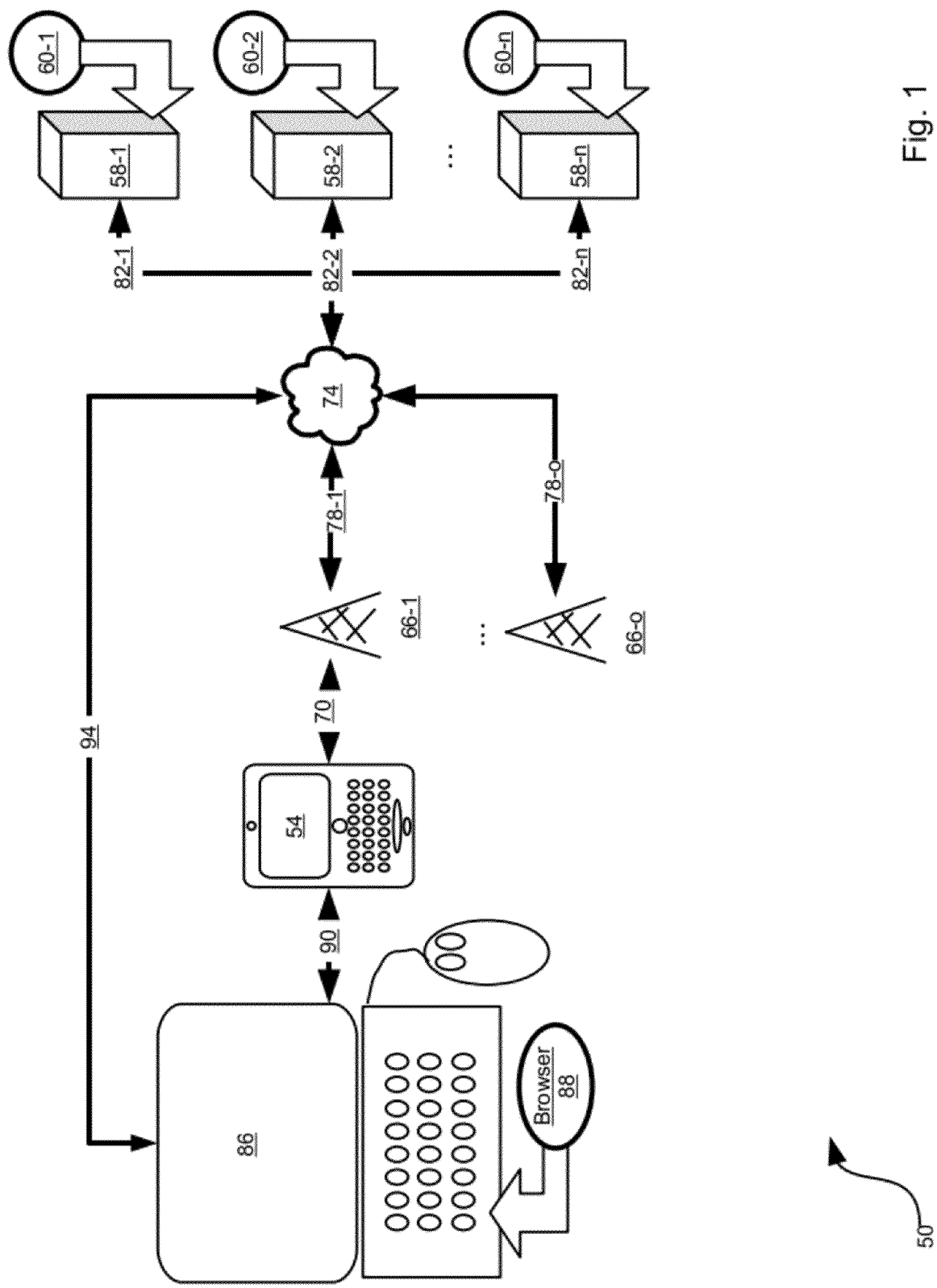
FIG. 1 is a schematic representation of a system for managing communications between a computing device and a client machine.

An aspect of this specification provides a mobile computing device including a storage configured to maintain a host application, a processor configured to execute the host application and an interface configured to connect to a client machine. The interface further is configured to carry a web request from the client machine to the processor. The host application configured to respond to the web request.

The host application may be configured to respond to the web request with markup language documents.

The documents may be configured to capture details of responses of the mobile computing device.

The markup language documents may be validated against a markup language schema.

The web request may ask for characteristics of the mobile computing device.

The web request may ask for an unique identifier of the mobile computing device.

The host application may be configured to permit access to a client application.

The client application may include an email application.

The client application may include a contact manager application.

The client application may include a calendar application.

The markup language may include a Hypertext Transfer Protocol language.

The markup language may include an eXtensible Markup Language.

Another aspect of this specification provides a method for managing communications between a mobile computing device and a client machine. The mobile computing device includes a processor and an interface. The method involves executing, via the processor, a host application. The method further involves connecting, via the interface, to the client machine. The method also involves carrying, via the interface, a web request from the client machine to the processor. In addition, the method involves responding, via the host application, to the web request.

The host application may be configured to respond to the web request with markup language documents.

The markup language documents may be configured to capture details of responses of the mobile computing device.

The markup language documents may be validated against a markup language schema.

The web request may ask for characteristics of the mobile computing device.

The web request may ask for a unique identifier of the mobile computing device.

The host application may be configured to permit access to a client application.

Another aspect of this specification provides a computer program product for a mobile computing device having a processor and an interface. The computer program product includes a non-transitory computer-readable storage medium having a computer-readable program code adapted to be executable on the processor to implement a method for managing communications between the mobile computing device and a client machine. The method involves executing, via the processor, a host application. The method also involves connecting, via the interface, to the client machine. The method further involves carrying, via the interface, a web request from the client machine to the processor. In addition, the method involves responding, via the host application, to the web request.

Referring now to FIG. 1, a system for managing a communications between a computing device and a client machine is indicated generally at 50. In a present embodiment system 50 comprises at least one computing device in the form of a mobile computing device 54 and at least one server 58-1, 58-2 . . . 58-*n*. (Generically, server 58, and collectively, servers 58. This nomenclature is used elsewhere herein.)

A wireless link 70 connects mobile computing device 54 with one of a plurality of wireless base stations 66-1 . . . 66-*o*. (Generically, wireless base station 66, and collectively, wireless base stations 66.) In FIG. 1, mobile computing device 54 is shown as connecting to a first base station 66-1 via wireless link 70, but mobile computing device 54 can also connect to other base stations 66 in system 50. Backhaul links 78-1 . . . 78-*o* (generically, backhaul link 78, and collectively, backhaul links 78) connect each base station 66 to a network 74. Additional backhaul links 82-1, 82-2 . . . 82-*n* (generically, backhaul link 82, and collectively, backhaul links 82) connect network 74 to each server 58.

Mobile computing device 54 can be any type of electronic device that can be used in a self-contained manner and to interact with content available on network 74. Interaction includes displaying of information on mobile computing device 54 as well as to receive input at mobile computing device 54 that can in turn be sent back over network 74. Mobile computing device 54 will be explained in greater detail below.

It should now be understood that the nature of network 74 and links 70, 78 and 82 associated therewith is not particularly limited and are, in general, based on any combination of architectures that will support interactions between mobile computing device 54 and servers 58. In a present embodiment network 74 includes the Internet as well as appropriate gateways and backhauls to links 78 and 82. For example, backhaul links 78 and backhaul links 82 can be based on a T1, T3, OC3 or any other suitable wired or wireless connections. Accordingly, the links 78 and 82 between network 74 and the interconnected components are complementary to functional requirements of those components.

Link 70 may be based on, by way of non-limiting examples, a core mobile network infrastructure, such as, by way of non-limiting examples, one or more of Global System for Mobile communications ("GSM"); Code Division Multiple Access ("CDMA"); CDMA 2000 3G; or Evolution-Data Optimized or Evolution-Data ("EVDO"); or successors thereto or hybrids or combinations thereof; or on a wireless local area network ("WLAN") infrastructures such as, by way of non-limiting examples, the Institute for Electrical and Electronic Engineers ("IEEE") 802.11 Standard (and its variants) or Bluetooth or the like or hybrids or combinations thereof. Note that in an example variation of system 50 it is contemplated that link 70 may be a wired connection.

A client machine 86 also connects to mobile computing device 54 via a link 90. In a present example implementation, client machine 86 is a desktop, notebook, tablet or laptop computer and link 90 is a direct connection effected wirelessly or wired. Where link 90 is wireless, then link 90 can be, for example, a Bluetooth™ or a peer-to-peer Wi-Fi connection between client machine 86 and mobile computing device 54. Where link 90 is wired, then link 90 can be, for example, a universal serial bus (USB) or Firewire connection. Those skilled in the art will now recognize other types of wired or wireless connections that can be used to effect a direct connection for link 90. In variations, link 90 can be effected indirectly through, for example, a local area network or a Wi-Fi network, or even through a wide area network such as network 74.

Client machine 86 is initially configured to maintain or execute at least a web browser application 88, and need not have direct access to network 74, though in some cases such a direct connection to network 74 would be possible through a link 94. Accordingly, client machine 86 can be based on any computing environment that provides web browsing functionality. For example, such a computing environment can be based on an Intel™ or AMD™ or other microprocessor, with accompanying volatile storage (e.g. random access memory) and non-volatile storage (e.g. Flash, Hard disc drive), read only memory (ROM), network interface card(s), video cards that connect to one or more displays, a keyboard, a mouse (or other pointing device). Any operating system may be used, including, for example, an operating system offered by Microsoft™, or a Linux™ operating system, or an operating system offered by Apple™ Computer. Browser application 86 can be any browser application can be used that is executable on a respective operating system, including Firefox™, Internet Explorer™, Chrome™, Opera™ or Safari™. Typically, though not necessarily, client machine 86 will have a display or a keyboard or both that are larger than that provided on mobile computing device 54. Client machine 86 may also have another configuration, such as a tablet computing device.

Servers 58 can be based on any well-known server environment including a module that houses one or more central processing units, volatile memory (e.g. random access memory), persistent memory (e.g. hard disk devices) and network interfaces to allow servers 58 to communicate over network 74. For example, each server 58 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for each server 58 is contemplated. Furthermore, it is contemplated that each server 58 may be implemented as a plurality of interconnected servers, in a so-called server farm, which are mirrored or otherwise configured for load balancing or failover or high availability or any or all of those.

As will be discussed further below, each server 58 maintains a different networking application 60. Networking applications 60-1, 60-2 . . . 60-*n* (generically, network application 60, and collectively, network applications 60) can be any application whereby a corresponding client-side application executes on mobile computing device 54 which accesses data or any other server functions on a given server 58. Networking applications can be, by way of non-limiting examples, personal information management applications, social networking applications, or messaging applications. Non-limiting examples of personal information management applications include calendaring and contact management applications. Non-limiting examples of social networking application 60 include Facebook™, Twitter™, LinkedIn™, and MySpace™. Networking applications 60 can also comprise message applications such email, BlackBerry Messenger, AOL instant messenger (AIM), Yahoo Messenger (YM), Google Talk (Gtalk), Lotus Connections, and Windows Live Messenger. There are many others.

Variations of the present specification contemplate the omission of network 74 and servers 58 altogether, and focus instead on the pairing via link 90 of device 54 with client machine 86.

Figure 2:
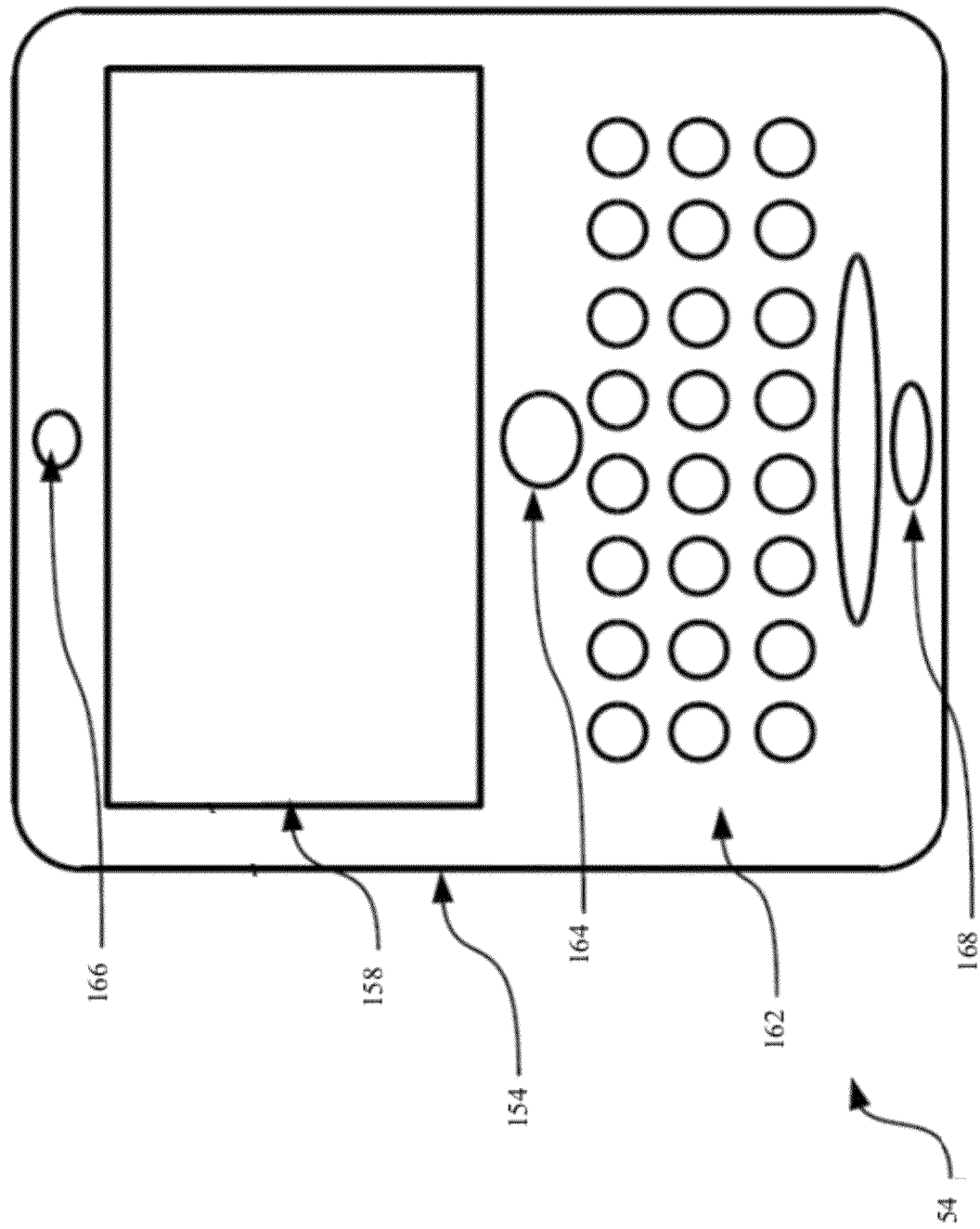
FIG. 2 is a representation of a front view of the mobile computing device of the system of FIG. 1.
Figure 3:
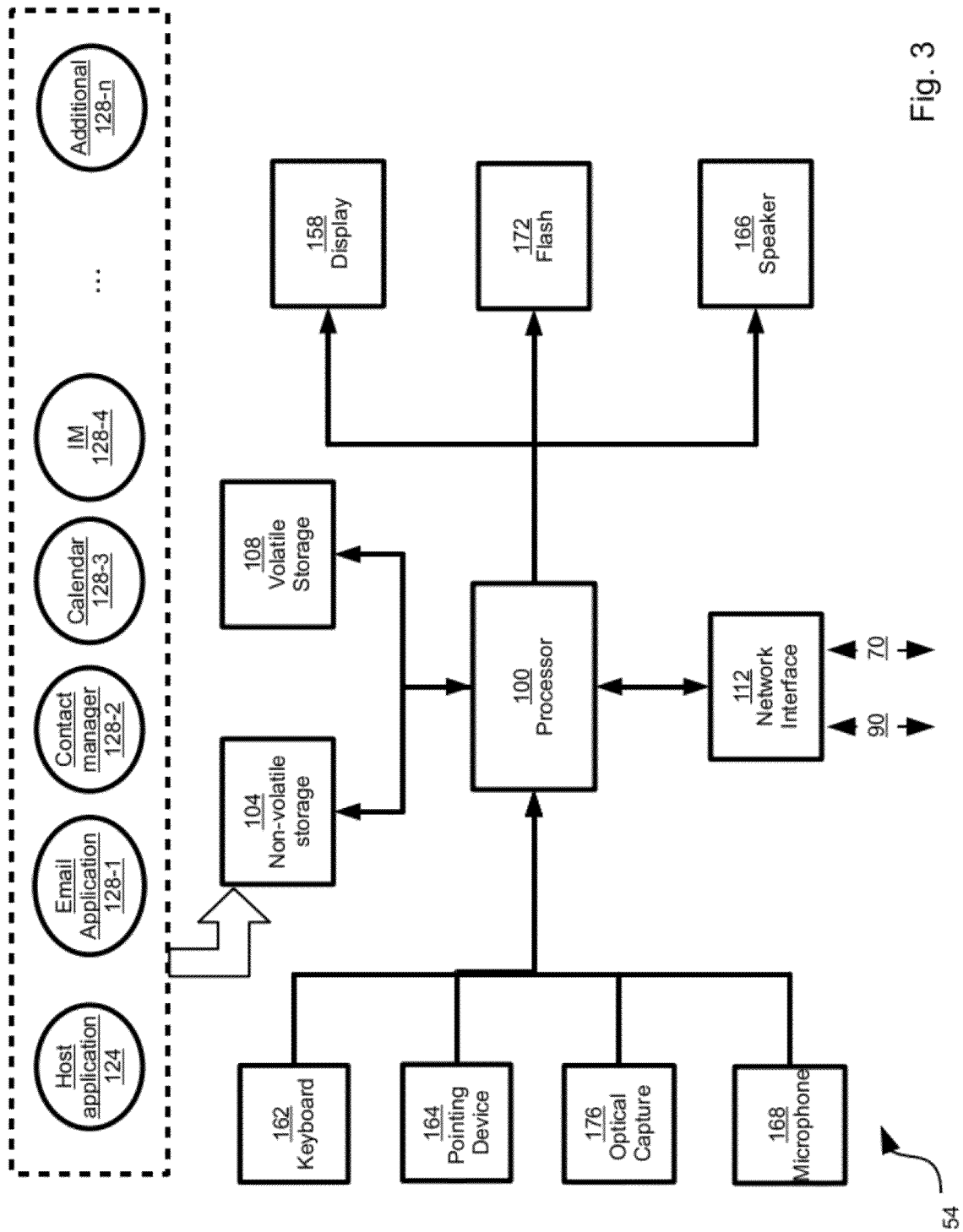
FIG. 3 is a block diagram of the device shown in FIG. 1.

FIG. 2 and FIG. 3 show different views and representations of a non-limiting example of a mobile computing device 54 which can execute one or more applications as discussed in greater detail below. It is to be understood that mobile computing device 54 is an example, and it will be apparent to those skilled in the art that a variety of different portable electronic device structures are contemplated. Indeed variations on mobile computing device 54 can include, without limitation, a cellular telephone, a portable email paging device, a network enabled digital camera, a portable music player, a portable video player, a portable video game player.

Referring to FIG. 2, in a present, non-limiting example, device 54 comprises a chassis 154 that supports a display 158. Display 158 can comprise one or more light emitters such as an array of light emitting diodes (LED), liquid crystals, plasma cells, or organic light emitting diodes (OLED). Other types of light emitters are contemplated. Chassis 154 also support a keyboard 162. It is to be understood that this specification is not limited to any particular structure, spacing, pitch or shape of keyboard 162, and the depiction in FIG. 2 is an example. For example, full or reduced "QWERTY" keyboards are contemplated. Other types of keyboards are contemplated. (In variations, device 54 may also be a touch-screen device with no physical keyboard.) Device 54 also comprises a pointing device 164 which can be implemented as a touch-pad, joystick, trackball, track-wheel, or as a touch sensitive membrane on display 158. Device 54 may also comprise a speaker 166 for generating audio output, and a microphone 68 for receiving audio input.

FIG. 3 shows a schematic block diagram of the electronic components of device 54. It should be emphasized that the structure in FIG. 3 is an example. Device 54 includes a plurality of input devices which in a present embodiment includes keyboard 162, pointing device 164, and microphone 168 and an optical capture unit 176. Fewer, additional, or alternative input devices are contemplated. Input from keyboard 162, pointing device 164 and microphone 168 and optical capture unit 176 is received at a processor 100. Processor 100 can be configured to execute different programming instructions that can be responsive to the input received via input devices. To fulfill its programming functions, processor 100 is also configured to communicate with a non-volatile storage unit 104 (e.g. Erase Electronic Programmable Read Only Memory ("EEPROM"), Flash Memory) and a volatile storage unit 108 (e.g. random access memory ("RAM")). Programming instructions that implement the functional teachings of device 54 as described herein are typically maintained, persistently, in non-volatile storage unit 104 and used by processor 100 which makes appropriate utilization of volatile storage 108 during the execution of such programming instructions.

Processor 100 in turn is also configured to control display 158, speaker 166 and flash 172, also in accordance with different programming instructions and optionally responsive to different input receive from the input devices. Fewer, additional, or alternative output devices are contemplated.

Processor 100 also connects to a network interface 112, which can be implemented in a present embodiment as one or more radios configured to communicate over link 70 and link 90. Network interface 112 can thus be generalized as a further input/output device that can be utilized by processor 100 to fulfill various programming instructions. It will be understood that interface 112 is configured to correspond with the network architecture that defines each link 70 and link 90. It is also contemplated each network interface 112 can include multiple radios to accommodate the different protocols that may be used to implement different types of links where the network architecture for each link 70 differs between base stations 66, or where link 90 may be based on different architectures. For example, link 90 may also be a wired link (e.g. USB) in which case it may not have a radio at all.

In a present embodiment, device 54 is also configured to maintain, within non-volatile storage 104, a host application 124, and one or more client applications 128 such as an email application 128-1, a contact manager application 128-2, a calendar application 128-3, an instant messenger application 128-4 or one or more of a plurality of additional applications 128-n. Non-limiting examples of additional applications 128-n can comprise, without limitation, one or more of social networking client applications, e.g., Twitter, Facebook, MySpace, LinkedIn; other applications associated with online communities e.g., Flickr, Gtalk, etc; document tools such as Google Docs. Any one or more of host application 124 and client applications 128 can be pre-stored in non-volatile storage 104 upon manufacture of device 54, or downloaded via network interface 112 and saved on non-volatile storage 104 at any time subsequent to manufacture of device 54. Each application 128 is also configured to interact with its corresponding network application 60 as needed.

Processor 100 is configured to execute each application 128, making use of input from input devices and controlling display 158 to generate output based on that input and according to the programming instructions of each application 128. In general, each application 128 can be based on any existing or future application 128 that can be executed entirely on a device such as device 54, even when link 90 is not active and device 54 is disconnected from client machine 86. For example, email application 128-1 can be a standard electronic mail application that is already commonly deployed on various devices such as device 54 and entirely usable on device 54, without any connection to client machine 86, and while accessing servers 58 as needed. Likewise contact manager application 128-2, calendar application 128-3, instant messenger application 128-4 and any of the additional applications 128-n can be based on such applications that are already commonly deployed, or may be deployed in the future, and entirely usable on device 54 without any connection to client machine 86, and while accessing servers 58 as needed.

Processor 100 is also configured to execute host application 124 to permit access to client applications 128 via client machine 86, when link 90 is active, as will be explained further below.

Figure 4:
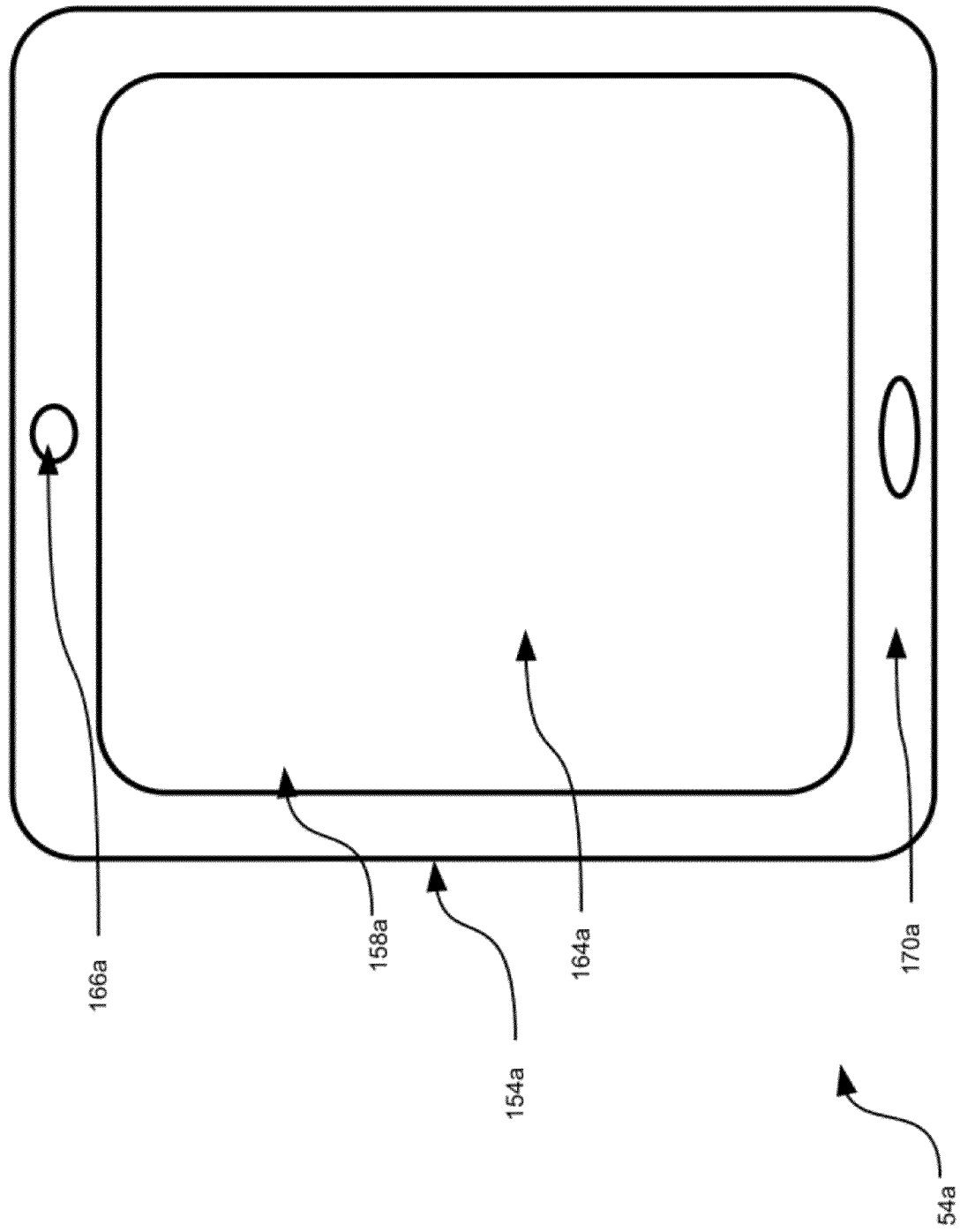
FIG. 4 is a representation of a variation of the mobile computing device of FIG. 1.

Referring briefly to FIG. 4, a variation on device 54 is indicated generally as device 54a. Device 54a comprises many of the same components as device 54, and therefore like components bear like references except followed by the suffix "a". Of note is that device 54a excludes keyboard 162 and pointing device 164. Instead, device 54a comprises a touch screen 164a which provides the combined functionality of keyboard 162 and pointing device 164. Further variations on device 54 will now occur to those skilled in the art, but for convenience, further discussion of the present specification will focus on device 54 as described above. As will become apparent from further discussion herein, the lack of a full keyboard in device 54a presents certain limitations for providing input to device 54a, and those limitations may be mitigated by the present specification. It should also be noted that device 54a may also take the form of a tablet computer, or may include a slide-out keyboard.

Figure 5:
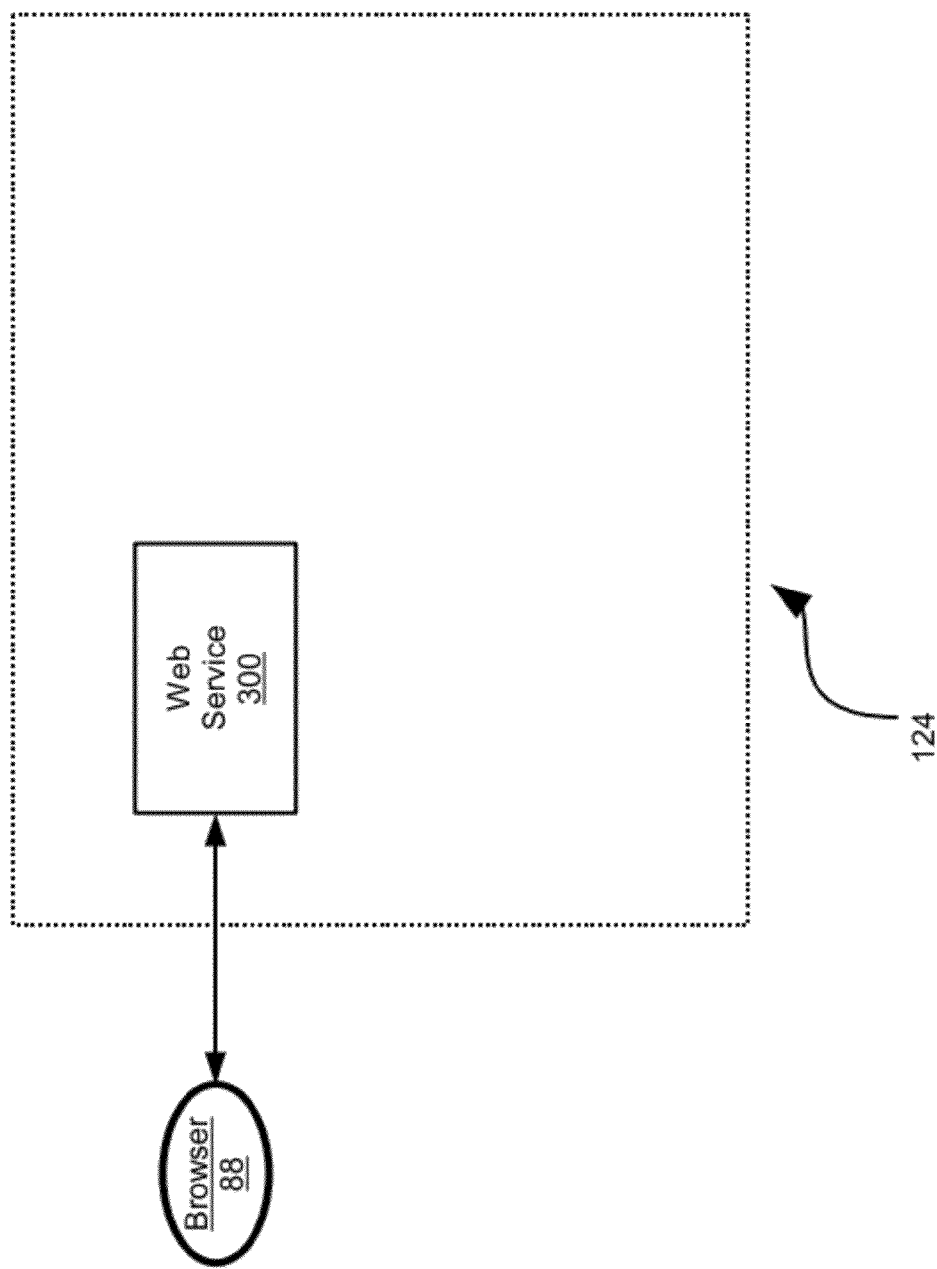
FIG. 5 is a block diagram showing a non-limiting example of the host application in FIG. 3.

FIG. 5 shows a block diagram of an example an implementation of host application 124 and its virtual connections to browser 88. Those skilled in the art will now recognize that the components and connections in FIG. 5 can be implemented using the hardware structures shown in FIG. 1, or variations thereon. Host application 124 thus comprises a web service 300. Web service 300 is configured to generate and serve web content to browser 88. Web service 300 is thus configured to generate hyper-text markup language (HTML), as desired, and any other code (e.g. JavaScript files, Cascading Style Sheets) that are usable by browser 88, so that graphical interfaces can be generated on client machine 86.

Figure 6:
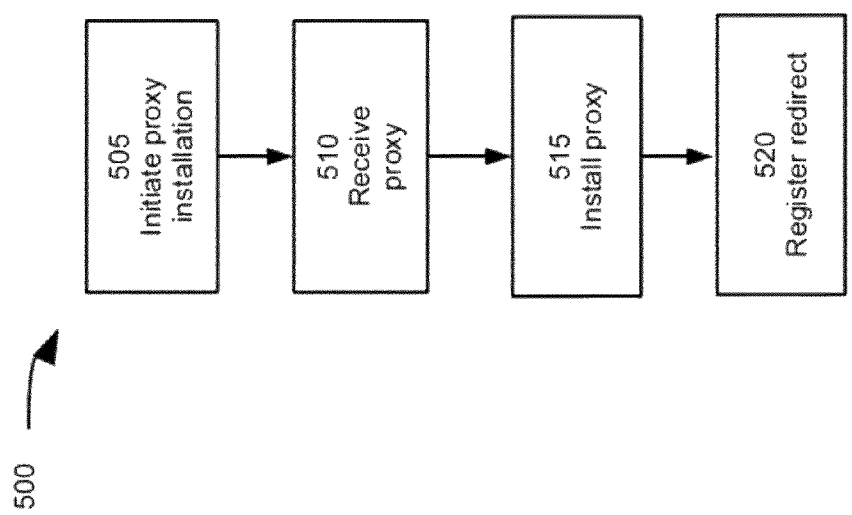
FIG. 6 is a flow-chart depicting a method of installing a proxy application.

Referring now to FIG. 6, a flow-chart depicting a method for provisioning a client machine to interact with a mobile electronic device is indicated generally at 500. Method 500 can be implemented using system 50, and for purposes of explaining method 500 it will be assumed that method 500 is performed using system 50. However, it is to be understood that variations are contemplated to both method 500 and system 50 and such variations are within the scope of this specification. Method 500 is not strictly required, but in a present implementation method 500 provides a proxy on client machine 86 such that web service 300 is addressable and reachable from the address bar in browser 88. Method 500 also assumes that link 90 is a direct link between client machine 86 and mobile electronic device 54. Again, such a direct connection for link 90 can be a peer-to-peer Bluetooth™ connection whereby client machine 86 and device 54 are "paired" using known Bluetooth™ hardware and network protocols. Such a direct connection for link 90 can also be a USB cable connection. Other means for implementing link 90 will now occur to those skilled in the art. In a present implementation, it is assumed that link 90 is a Bluetooth™ connection.

Block 505 comprises receiving an instruction to install a proxy application. Block 505 can be implemented in different ways. One factor that affects how block 505 is implemented is the location where the installation file for the proxy application is stored. In one implementation, the proxy application is stored on a server (possibly one or more of servers 58, though not necessarily) connected to network 74, in which case installation initiation may be effected by entering a uniform resource locator (URL) into browser 88 that points to the network 74 address of the server that stores the proxy application. In another implementation, the proxy application is stored as a data file within non-volatile storage 104 of device 54. In this implementation, non-volatile storage 104 of device 54 is configured to appear as an external hard-disk when link 90 is active—this type of configuration being inherent in many operating systems and devices such as device 54, where link 90 is a USB connection. Thus, once device 54 appears as a hard-disk, the data file containing the proxy application can be downloaded via link 90 onto client machine 86. In variations, the proxy could be provided on a CD or other removable media.

Block 510 comprises receiving the proxy application for which installation was initiated at block 505. Where proxy application is stored on network 74, then block 510 comprises downloading the proxy application via network 74 and link 94. When proxy application is stored on device 54, then the proxy application is transferred via link 90 to client machine 86.

Those skilled in the art will now recognize other means of effecting block 505 and block 510.

Block 515 comprises installing the proxy application that was received at block 510. At this point it will be appreciated that the form in which proxy application is originally stored and received can vary according to the level of sophistication to be employed in the actual installation of the proxy application. It is presently contemplated that the proxy application will be an executable application that invokes an installation wizard, or the like, so that a simple series of key strokes on client machine 86 are all that is required to actually install the proxy application. However, proxy application can be received at block 510 in other forms.

Figure 7:
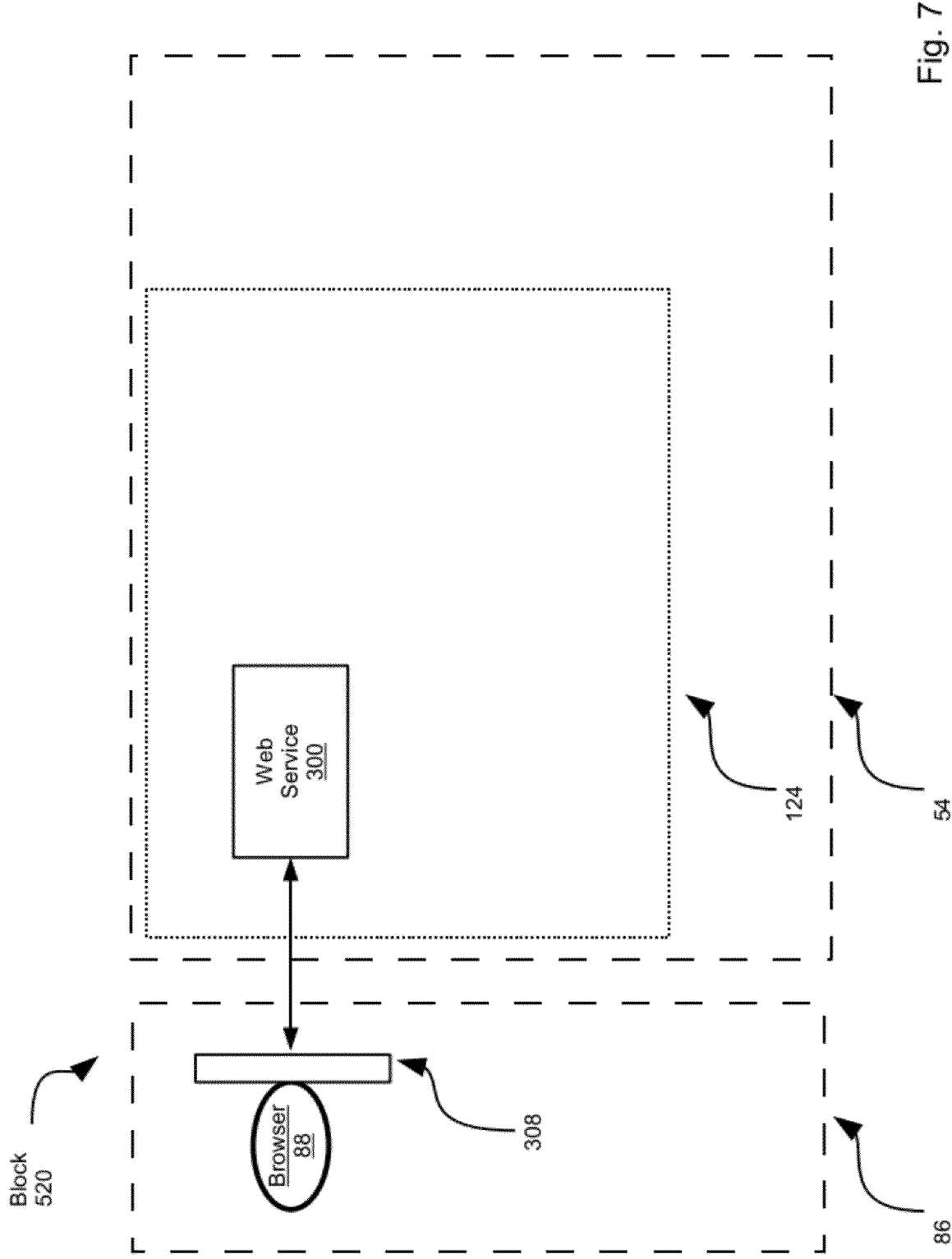
FIG. 7 shows an example of system 50 after installation of the proxy application according to the method of FIG. 6, using a variation of the block diagram in FIG. 5.

Block 520 comprises registering the proxy application installed at block 515. Such registration is local to the client machine and serves to identify a URL or Internet Protocol (IP) address redirect such that entry of that URL or IP addresses causes browser 88 to access web service 300. A representation of portions of system 50 is shown in FIG. 7, which itself is a variation on FIG. 5. FIG. 7 is thus substantially the same as FIG. 5, except that a proxy application 308 is shown as being installed on client machine 86 and sitting between browser 88 and web service 300 on device 54. Expressed another way, proxy application 308 configures client machine 86 so that entry of a given URL or other address in the address bar of browser 88 directs browser 88 to connect with web service 300 and to generate a web page on the display of client machine 86 that corresponds to a web page being offered by web service 300. An example of such a URL may be, http://localhost, provided such a URL is not already reserved for another proxy application on client machine 86. Thus, upon entry of http://localhost, browser 88 will be directed to proxy 308 and in turn browser 88 will connect to web service 300. Returning to the example where link 90 is based on Bluetooth™, then proxy application 308 sits between browser 88 and the Bluetooth™ service and drivers executing on client machine 86, and forms a virtual connection with device 54 according to the Bluetooth pairing that has been registered on the Bluetooth™ service of device 54. In turn, web service 300 is configured to respond to HTTP requests received via the Bluetooth service that is resident on device 54.

At this point it is to be reiterated that method 500 and the use of proxy application 308 is not needed in all implementations contemplated by this specification, and accordingly, certain of the following discussions may not make reference to proxy application 308 and FIG. 7. However, it is also to be understood that the following discussion is also applicable to configurations that utilize proxy application 308.

The present specification contemplates the use of common standards to manage interactions between browser 88 and web service 300 and is novel in its use of web and internet standards to manage communications between the client machine 86 and device 54 over link 90.

Device 54 thus runs a web server and client machine 86 communicates with it using simple web requests (HTTP and HTTPS gets and posts). Device 54 is configured to respond to these requests with eXtensible Markup Language (XML) documents validated against an XML schema. These documents capture the details of the response of device 54. For example, the browser 88 might ask for the basic characteristics of device 54, such as, by way of a simple non-limiting example, a unique hardware identifier (e.g. or in a BlackBerry™ environment, a PIN). Device 54 could respond with an XML document similar to this one:

```
<device_characteristics>    <BBPIN>999999999</BBPIN>
<GUID>AAAAAAAAAABBBBBBBBBCCCCCCCCCDDDDDDDDDD</GUI
D> <NetworkType>9999</NetworkType> <MUXVersion>9999</MUXVersion>
<EVDOModemVersion>9999</EVDOModemVersion><ESN>-
9999999999</ESN><OSType>9999</OSType>
<VendorID>9999</VendorID> <MEID>FFFFFFFFFFFFF</MEID>
<IMEI>FFFFFFFFFFFFFFF</IMEI>
<HubAddress>\\RIM\\Tablet</HubAddress><Power>999</Power>
<VSerialVer>9999</VSerialVer> <SimulatorID>9999</SimulatorID>
</device_characteristics>
```

For larger file transfers (e.g. backup and restore of device 54 onto client machine 86) HTTP is also used to send and receive the files. This approach allows for loose coupling between client machine 86 and device 54.

At this point it should be understood that the term "browser" in relation to browser 88 is to be construed in a non-limiting sense and need not be limited to a traditional web-browser such as Internet Explorer™ or Firefox™. Rather, browser 88 could be, in the BlackBerry context, BlackBerry Desktop Manager, or browser 88 might be a test automation framework or it browser 88 might be a third party application. The term "browser" is intended to denote an application that is capable of making HTTP requests, and the like, which can be understood by web service 300.

The use of XML schema validation to avoid invalid communications can simplify the implementation of both end points. The use of SSL-based HTTPS allows for communications to be encrypted and protected from unintended observers. Exchange of previously verified certificates allows both end points to be verified and trusted.

Figure 8:
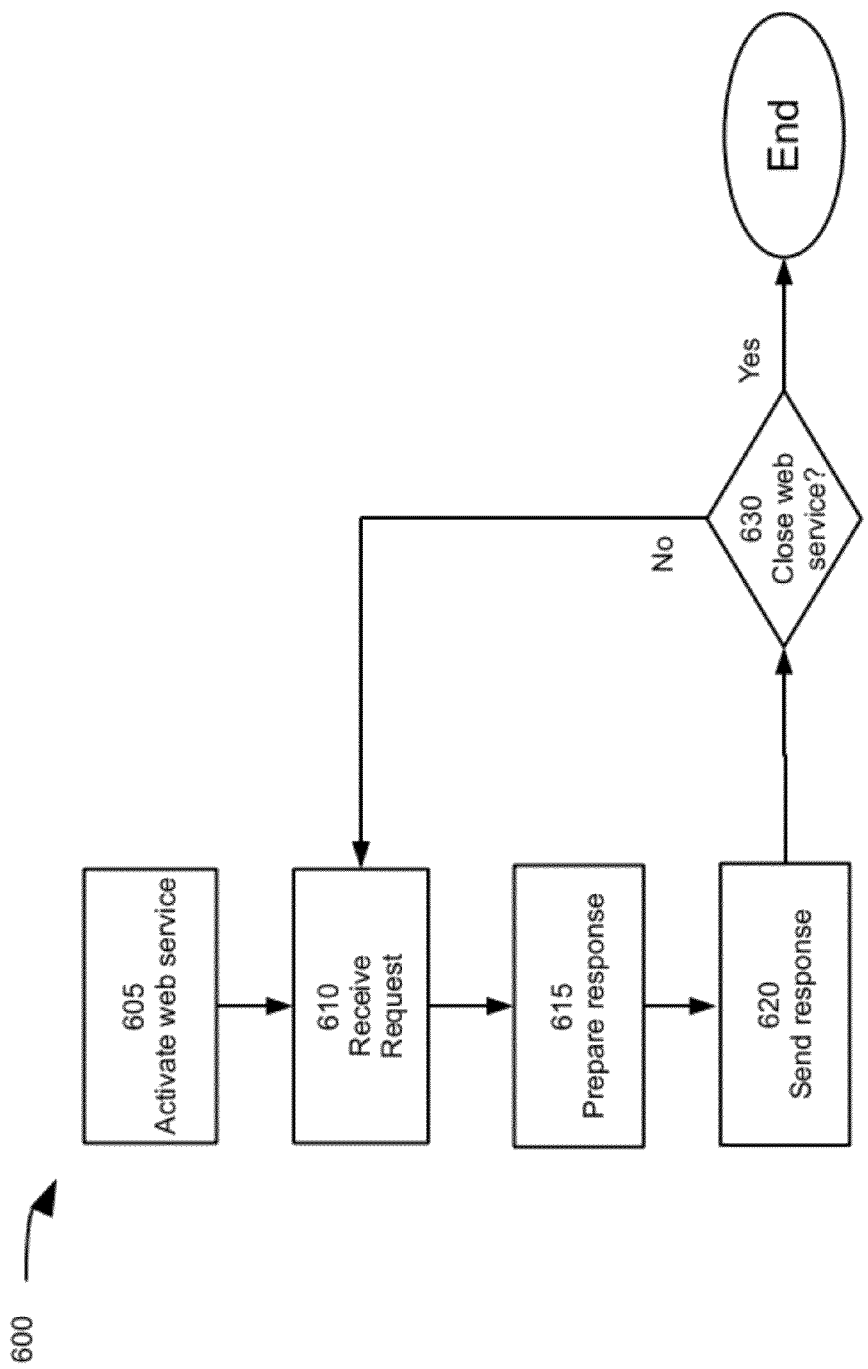
FIG. 8 shows a method of managing communications between a computing device and a client machine.

Referring now to FIG. 8, a flow-chart depicting a method for managing communications between a mobile device and a client machine an application across a plurality of computers is indicated generally at 600. Method 600 can be implemented using system 50, and for purposes of explaining method 600 it will be assumed that method 600 is performed using system 50. However, it is to be understood that variations are contemplated to both method 600 and system 50 and such variations are within the scope of this specification. Performance of method 600 presumes that link 90 is active between device 54 and client machine 86.

Block 605 comprises activating a web service. Block 605 is substantially effected with the connection between browser 88 and web service 300, as shown in FIG. 5, is established.

Block 610 comprises receiving a request. The request is received by the web service 300 from the browser 88. The requests may be simple web requests in the format of HTTP or HTTPS "gets" and "posts".

Block 615 comprises preparing a response to the request. The web service 300 is configured to respond to these requests with markup language documents, (such as eXtensible Markup Language (XML) documents) validated against a markup language schema (e.g. an XML schema). These documents capture the details of response of device 54.

Block 620 comprises sending a response to the request. The web service 300 sends the response prepared at block 615 back to the web service 300.

Block 630 comprises determining whether to close the web service, or whether to wait for further requests.

Those skilled in the art will appreciate that in some implementations, the functionality of mobile devices 54, 54a can be implemented using pre-programmed hardware or firmware elements (e.g., application specific integrated circuits (ASICs), electrically erasable programmable read-only memories (EEPROMs), etc.), or other related components. In other implementations, the functionality of mobile devices 54, 54a can be achieved using a computing apparatus that has access to a code memory (not shown) which stores computer-readable program code for operation of the computing apparatus. The computer-readable program code could be stored on a non-transitory computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Other variations, combinations, and subsets will now occur to those skilled in the art.

The invention claimed is:

1. A mobile computing device comprising:
    a storage configured to maintain a host application, the host application comprising a web service which is configured to generate and serve web content to a browser at a client machine;
    a processor configured to execute the host application;
    an interface configured to connect to the client machine via a local direct connection, the interface further configured to carry a web request received from a proxy application on the client machine to the processor via the local direct connection, the host application configured to respond to the web request, the proxy application on the client machine configured to direct the browser at the client machine to connect to the web service at the mobile computing device;
    wherein the web request is configured to ask for at least one characteristic of the mobile computing device, and the host application is configured to respond to the web request with a markup language document, which is configured to capture details of responses of the mobile computing device and validated against a markup language schema.

2. The mobile computing device of claim 1, wherein the web request asks for a unique identifier of the mobile computing device.

3. The mobile computing device of claim 1, wherein the host application is configured to permit access to a client application.

4. The mobile computing device of claim 3, wherein the client application comprises an email application.

5. The mobile computing device of claim 3, wherein the client application comprises a contact manager application.

6. The mobile computing device of claim 3, wherein the client application comprises a calendar application.

7. The mobile computing device of claim 1, wherein the markup language comprises a Hypertext Markup Language.

8. The mobile computing device of claim 1, wherein the markup language comprises an eXtensible Markup Language.

9. A method for managing communications between a mobile computing device and a client machine, the mobile computing device comprising a processor and an interface, the method comprising:
    executing, via the processor, a host application, the host application comprising a web service configured to generate and serve web content to a browser at the client machine;
    connecting the interface of the mobile computing device to the client machine via a local direct connection and through a proxy application on the client machine configured to direct the browser at the client machine to connect to the web service at the mobile computing device;
    carrying, via proxy application, the local direct connection, and the interface, a web request from the client machine to the processor, the web request being configured to ask for at least one characteristic of the mobile computing device; and
    responding, via the host application, to the web request with a markup language document, which is configured to capture details of responses of the mobile computing device and validated against a markup language schema.

10. The method of claim 9, wherein the web request asks for a unique identifier of the mobile computing device.

11. The method of claim 9, wherein the host application is configured to permit access to a client application.

12. The method of claim 9, wherein connecting the interface of the mobile computing device to the client machine via the local direct connection comprises connecting the interface of the mobile computing device to the client machine via a universal serial bus (USB) connection or a Bluetooth connection.

13. A computer program product, for a mobile computing device having a processor and an interface, the computer program product comprising a non-transitory computer-readable storage medium having a computer-readable program code adapted to be executable on the processor to implement a method for managing communications between the mobile computing device and a client machine, the method comprising:

executing, via the processor, a host application, the host application comprising a web service configured to generate and serve web content to a browser at the client machine;

connecting the interface of the mobile computing device to the client machine via a local direct connection and through a proxy application on the client machine configured to direct the browser at the client machine to connect to the web service at the mobile computing device;

carrying, via the proxy application, the local direct connection, and the interface, a web request from the client machine to the processor, the web request being configured to ask for at least one characteristic of the mobile computing device; and responding, via the host application, to the web request with a markup language document, which is configured to capture details of responses of the mobile computing device and validated against a markup language schema.

14. The mobile computing device of claim 1, wherein the local direct connection comprises a universal serial bus (USB) connection.

15. The mobile computing device of claim 1, wherein the local direct connection comprises a Bluetooth connection.

16. The computer program product of claim 13, wherein the local direct connection comprises a universal serial bus (USB) connection or a Bluetooth connection.

\* \* \* \* \*

UNITED STATES PATENT AND TRADEMARK OFFICE
CERTIFICATE OF CORRECTION

| | |
|---|---|
| PATENT NO. | : 9,021,016 B2 |
| APPLICATION NO. | : 13/204442 |
| DATED | : April 28, 2015 |
| INVENTOR(S) | : Willis et al. |

It is certified that error appears in the above-identified patent and that said Letters Patent is hereby corrected as shown below:

In the claims,

Column 10, Line 57, In Claim 9, after "via" insert -- the --.

Signed and Sealed this
Ninth Day of February, 2016

Michelle K. Lee
*Director of the United States Patent and Trademark Office*